United States Patent [19]

Kamen et al.

[11] Patent Number: 5,585,153
[45] Date of Patent: *Dec. 17, 1996

[54] HOT STAMPING GLASS

[75] Inventors: Melvin E. Kamen, Highlands; Bhupendra Patel, Edison, both of N.J.; Phillip Bernstein, Yardley, Pa.

[73] Assignee: Revlon Consumer Products Corporation, New York, N.Y.

[ * ] Notice: The term of this patent shall not extend beyond the expiration date of Pat. No. 5,391,247.

[21] Appl. No.: 430,679

[22] Filed: Apr. 28, 1995

Related U.S. Application Data

[62] Division of Ser. No. 233,548, Apr. 26, 1994, abandoned, which is a continuation of Ser. No. 824,968, Jan. 24, 1992, abandoned.

[51] Int. Cl.$^6$ ............................................. C03C 17/38
[52] U.S. Cl. .................. 428/35.7; 156/233; 156/272.6; 156/273.3; 156/275.5; 156/307.7; 156/312
[58] Field of Search ............... 156/233, 272.2, 156/273.3, 275.5, 275.7, 307.1, 307.3, 307.4, 307.7, 307.9, 309.9, 311, 312, 267, 250; 215/DIG. 6; 428/35.7

[56] References Cited

U.S. PATENT DOCUMENTS

| | | | |
|---|---|---|---|
| 3,235,395 | 3/1962 | Scharf | 117/3.3 |
| 3,519,512 | 7/1970 | Downs | 156/236 |
| 4,053,344 | 10/1977 | Hirahara | 156/247 |
| 5,104,719 | 4/1992 | Kamen et al. | 428/195 |
| 5,178,952 | 1/1993 | Yamamoto et al. | 428/425.8 |
| 5,391,247 | 2/1995 | Kamen | 156/233 |

FOREIGN PATENT DOCUMENTS

| | | |
|---|---|---|
| 106628 | 4/1984 | European Pat. Off. . |
| 55-23222 | 4/1980 | Japan . |
| 57-152992 | 6/1982 | Japan . |
| 57-152992 | 9/1982 | Japan . |
| 59-184746 | 4/1983 | Japan . |
| 59-184746 | 2/1984 | Japan . |
| 63-17075 | 7/1988 | Japan . |

OTHER PUBLICATIONS

Union Carbide Technical Disclosure "Formulating Ultraviolet Light–Cured Cyracure® Cycloaliphatic Epoxide Coatings".

*Primary Examiner*—Charles Nold
*Attorney, Agent, or Firm*—Julie Blackburn

[57] ABSTRACT

A method for applying a decorative coating to glass and the resulting glass products.

20 Claims, No Drawings

HOT STAMPING GLASS

This is a divisional of application Ser. No. 233,548 filed Apr. 26, 1994, now abandoned which is in turn a continuation of Ser. No. 824,968, filed Jan. 24, 1992, abandoned.

TECHNICAL FIELD

The invention is in the field of applying decorative coatings to glass.

BACKGROUND OF THE INVENTION

Hot stamping is the heat transfer of a pigmented color or metallized surface from a polyester carrier onto a thermoplastic substrate. A heated die or roller is used to apply pressure to a foil. The pressure forces the pigmented or metallized portion of foil into contact with the plastic substrate. The combination of heat and pressure softens the plastic substrate and activates the foil coating to form a strong chemical physical bond. When the foil is pulled away, only the areas subjected to the hot stamp remain affixed to the plastic substrate. A vertical stamping or roll-on machine is used for the operation. The vertical stamping machine contains a heated die of brass, steel or silicone rubber to transfer an area or a specific pattern as each part is placed in position. Roll-on methods utilize a silicone rubber roller or arced die to apply the foil in a continuous or batch process. Hot stamping is an efficient, inexpensive way to apply decoration to thermoplastic substrates. Hot stamping of this nature cannot be used with glass, however, because glass melts at a much higher temperature than most thermoplastic materials.

Generally decoration in the form of gold leaf, color design, or printing, etc. is applied to glass by a glazing process similar to that used with ceramics. For example, in gold leafing the gold decoration is applied to the glass container by a variety of methods such as silk screen, printing, etc. The container is then subjected to extremely high kiln temperatures and the decoration is, in essence, baked on. Unfortunately this process is time consuming, expensive, energy intensive, and subject to safety considerations due to the high temperatures and gases necessary to operate the kilns.

There is thus a great need for a simple, economical and ultra-safe procedure for applying decoration to glass substrates.

SUMMARY OF THE INVENTION

The invention is directed to a method for applying a decorative coating to glass comprising the steps of:

a) applying decoration to the glass with a curable adhesive ink, b) curing the adhesive ink, c) compressing a layer of foil against the glass with a compress heated to at least 250° F., d) peeling back the foil after removal of the compress, whereby foil remains adhered to the adhesive ink decoration.

The invention is also directed to decorated glass substrate wherein the decoration has been applied by:

a) applying decoration to the glass with a curable adhesive ink, b) curing the adhesive ink, c) compressing a layer of foil against the glass with a compress heated to at least 250°, d) peeling back the foil after removal of the compress, whereby the foil remains adhered to the adhesive ink decoration.

DETAILED DESCRIPTION

A wide variety of glass containers may be suitably used with the method of the invention, including but not limited to bottles, dishes, cups, glasses, and so on.

In the first step of the invention, the decoration is essentially "painted" onto the glass utilizing an adhesive ink. The "painting" may be accomplished by silk screening, stenciling, actual painting, or any of a wide variety of methods known to those skilled in the art. In the preferred embodiment of the invention the adhesive ink is applied by silk screening the ink onto the glass container utilizing the traditional screen and squeegee well known to those skilled in the art.

The term "adhesive ink" means a curable polymeric composition comprised of a monomer, a polymer dissolved in the monomer, and a photoinitiating agent. Other ingredients, such as silanes may be added to improve adhesion. Suitable monomers include isobornyl acrylate, urethane methacrylate, urethane acrylate, tetrahydrofurfuryl acrylate, acrylic resins, aromatic urethane acrylic resin, etc. A wide variety of polymers is suitable including but not limited to polyethylmethacrylate, polymethylmethacrylate, polyurethane, polyester acrylates, epoxy acrylates, etc. A wide variety of photoinitiators may be utilized including photoinitiators activated by heat, various chemicals, or actinic radiation, often in the ultraviolet spectrum. Photoinitiators suitable with actinic radiation include 1-hydroxycyclohexylphenylketone, 2,2-dimethoxy-2-phenyl acetophenone, diethyoxyacetophenone, and 2-methyl-1-(methylethiophenyl)-2-(4-morpholinyl)-1-propanone. In the preferred embodiment of the invention the monomer is isobornyl acrylate or urethane methacrylate. The preferred polymer is polyethylmethacrylate, and the preferred photoinitiator is 1-hydrocyclohexylphenylketone which is marketed under the tradename Irgacure 184 (Ciba-Geigy, Hawthorne, N.Y.). It is desireable to add a silane, specifically 3-glycidoxypropyl trimethyl silane to the adhesive ink composition. Silane is a known coupling agent with glass and will increase bond strength. Generally the monomer concentration of the adhesive ink ranges from 20–90%. About 10–35% of polymer is suggested, and about 3–10% photoinitiator. If silane is added to the composition, about 1–10% is suggested. Other ancillary ingredients may be added to the composition to enhance adhesion and cure rate. For example, acrylic acid derivatives, stabilizers, inert fillers, and so on.

In another preferred embodiment of the invention, pigments are added to the ink. The ink may then be silkscreened or painted onto the glass container and cured as usual. Foil may or may not be applied, as desired. The addition of pigment to the adhesive provides certain advantages. The adhesive, which is then visible on the glass can be used alone or combined with the use of foil to provide a two tone effect. Suitable colored adhesives are made by simply adding about 1–20% of a pigment to the adhesive. For example, suitable colored adhesives can be made by adding 10% titanium dioxide to the adhesive (white) or 15% carbon black to the adhesive (black).

As mentioned previously, the adhesive is cured according to the type of photoinitiator used. If actinic radiation sensitive photoinitiators are used, then the adhesive is cured by passing the decorated container under the appropriate intensity of ultraviolet light. In the preferred embodiment of the invention the adhesive is curable by actinic radiation, so the container is passed under ultraviolet light using a convention UV conveyer.

After the adhesive on the container has been cured, gold or silver foil is compressed against the container by means of a stamp, roller, or any suitable instrument known in the art for this purpose. The stamp must be heated to a temperature of at least 250° F., and is compressed tightly against the foil covered glass container. A hand held heated roller works well for this purpose such as the rollers made by Silicon Limited, Lancaster, N.Y.

The roller or stamp is compressed against the foil covered container for 1–3 seconds.

When the roller is removed and the foil peeled away, the foil adheres only to the portion of the container decorated with the adhesive ink.

The foil decoration according to the invention is inexpensive, simple, and eliminates the need for use of kilns and high temperatures to accomplish gold leaf-like designs on glass containers.

The invention is also directed to glass substrates decorated according to the methods set forth above.

The invention will be further described in connection with the following examples which are set forth for the purpose of illustration only.

EXAMPLE 1

Preparation of UV Curable Adhesive and Hot Stamping Glass Container therewith

Isobornyl acrylate, 37.5 grams, (Borden Chemical Co., Cincinnati, Ohio) and 12.5 grams Elvacite 2-13 (Dupont Co., Wilmington, Del.) was mixed and warmed in a microwave oven for one minute or until the Elvacite was completely dissolved. Irgacure 184, 2.5 grams by weight, was added and mixed until dissolved.

The above ink adhesive was used to silk screen designs on a glass container. The screen consisted of a 255 line (255 fibers/square inch) screen with the decorative design imprinted on it. The ink was brushed over with a squeegee, resulting in a glass container with ink decoration thereon.

The adhesive ink was cured utilizing a 300 watt 30 feet/minute UV conveyer. The container was passed through the conveyer from one to three times to achieve appropriate curing of the polymer.

Gold hot stamping foil (Crown, Royal Leaf, Paterson, N.J.) was compressed against the container utilizing a heated hand held roller (Silicon Limited, Lancaster, N.Y.). The heated roller was applied for a few seconds. The foil was then peeled away. Foil adhered only to the adhesive ink decoration.

The UV adhesive provided an excellent, smooth surfaced decoration with no irregularities.

EXAMPLE 2

Preparation of UV Curable Adhesive

An adhesive of the following formulation was prepared:
55 grams Ebecryl 6700, (aromatic urethane methacrylate) (RadCure Specialties, Atlanta, Ga.)
20 grams 203 Tetrahydrofurfuryl acrylate (Sartomer, Exton, Pa.)
20 grams 506 isobornyl acrylate #506 (Sartomer)
0.5 grams BYK-052 (Ciba-Geigy, Hawthorne, N.Y.) (defoaming agent),
5.0 grams Irgacure 184

The formulation was mixed as set forth in Example 1. The formulation was transferred to a glass slide utilizing a silk screen method. The adhesive was cured utilizing a UV conveyer with a 300 watt lamp and 30 feet/minute speed. Four passes were required to cure the adhesive.

The formulation was smooth and the cure time acceptable but adherence of the gold foil after the hot stamping process was spotty.

EXAMPLE 3

Preparation of Adhesive

A UV curable adhesive was prepared as follows:
24 grams isobornyl acrylate #203 (Sartomer)
17 grams Urethane acrylate #9625 (Sartomer)
5 grams Ebecryl A827 (aromatic urethane acrylate) (Radcure)
11 grams Ebecryl 6700 (aromatic urethane acrylate) (Radcure)
2.5 grams Irgacure 184
0.5 grams BYK-501 (Union Carbide)(wetting agent)
0.5 grams FC 171 (Union Carbide)(wetting agent)
0.5 grams A 151 (Union Carbide)(leveling agent)

The adhesive was transferred to a glass container using a silk screen process. The ink was smooth, provided a surface without irregularities, and adhered well to the glass.

EXAMPLE 4

Preparation of Adhesive Ink

An adhesive ink was prepared as follows:
75 grams Loctite 36331 (Loctite Corp., Newington, Conn.)
25 grams Elvacite 2043 acrylic resin (Polymethylmethacrylate) (Dupont Corp., Wilmington Del.)
2 grams Irgacure 184

This composition was mixed for about one hour with the mixer. The ink was then silk screened onto a glass container through a 255 line screen. The adhesive was cured by four passes through a 300 watt 30 feet/minute UV conveyer.

The surface was a bit bumpy and uneven after hot stamping.

EXAMPLE 5

Preparation of Adhesive Ink

An adhesive ink was prepared as follows:
27 parts urethane methacrylate
55 parts high boiling methacrylate resin
5 parts acrylic acid
5 parts hydroxyethylmethacrylate, 5 parts photoinitiator
3 parts substituted silane (Dow Corning, Huls Silane Ester "Scatterway")

The resulting formulation provides an excellent, easily curable ink which works well with hot stamping.

While the invention has been described in connection with the preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. A method of decorating a glass substrate with hot stamping foil comprising the steps of:
   a) applying a radiation curable adhesive ink to the glass substrate in a predetermined design that leaves some areas of the glass ink-free, said ink being operable when cured to bond to glass and, when heated after curing, to bond to hot stamping foil,
   b) completely curing the ink on the substrate by exposing it to the radiation by which it is curable, thereby bonding the ink design to the glass;
   c) pressing a sheet of hot stamping foil against the substrate with a compress heated to a temperature sufficient to cause the foil to adhere to the heated, cured, ink design, but not the the ink-free areas of the glass; and
   d) peeling the foil away from the substrate thereby leaving behind a portion of the foil permanently adhered to the adhesive ink design without the necessity of further irradiating the decorated substrate through the glass to effect complete adherence of the hot stamping foil.

2. The method of claim 1 wherein the adhesive ink is an actinic radiation curable polymeric composition.

3. The method of claim 2 wherein the adhesive ink is an ultraviolet radiation curable polymeric composition.

4. The method of claim 3 wherein the glass substrate has a first surface and a second surface.

5. The method of claim 4 wherein the decoration is applied to the first surface.

6. The method of claim 5 wherein the adhesive ink further comprises a silane coupling agent for glass.

7. The method of claim 6 wherein the adhesive ink further comprises a radiation activated photoinitiator that is operable to cure the polymeric composition upon exposure to the radiation to which the photoinitiator is sensitive.

8. The method of claim 7 wherein the photoinitiator is one that is activated by actinic radiation.

9. The method of claim 8 wherein the photoinitiator is one that is activated by ultraviolet radiation.

10. The method of claim 3 wherein the adhesive ink further comprises 1–20% by weight of pigment.

11. The method of claim 3 wherein the hot stamping foil is gold hot stamping foil or silver hot stamping foil.

12. The method of claim 10 wherein the hot stamping foil is applied to a portion of the heated, cured, ink design.

13. The method of claim 3 wherein the adhesive ink is applied by silk screening.

14. The method of claim 13 wherein the compress is heated to at least 250° F.

15. The method of claim 4 wherein the substrate is a bottle, dish, cup, or glass.

16. The method of claim 3 wherein the adhesive ink is a monomer, a polymer dissolved in the monomer, and a photoinitiating agent.

17. The method of claim 16 wherein the monomer is isobornyl acrylate, urethane methacrylate, urethane acrylate, tetrahydrofurfuryl acrylate, acrylic resins, aromatic urethane acrylic resin, or mixtures thereof.

18. The method of claim 17 wherein the polymer is polyethylmethacrylate, polymethylmethacrylate, polyurethane, polyester acrylate, epoxy, or mixtures thereof.

19. The method of claim 18 wherein the photoinitiator is 1-hydroxycyclohexylphenylketone, 2,2-dimethoxy-2-phenyl acetophenone, diethyoxyacetophenone, and 2-methyl-1-(methylethiophenyl)-2-(4-morpholinyl)-1-propanone, or mixtures thereof.

20. The method of claim 6 wherein the adhesive ink comprises, by weight, 10–35% polymer, 20–90% monomer, and 3–10% photoinitiating agent.

* * * * *